(12) United States Patent
Pastouchenko (10) Patent No.: US 10,308,368 B2
(45) Date of Patent: Jun. 4, 2019

(54) TURBOFAN ENGINE AND METHOD OF REDUCING AIR FLOW SEPARATION THEREIN

(71) Applicant: General Electric Company, Schenectady, NY (US)

(72) Inventor: Nikolai N. Pastouchenko, Glenville, NY (US)

(73) Assignee: General Electric Company, Schenectady, NY (US)

( * ) Notice: Subject to any disclaimer, the term of this patent is extended or adjusted under 35 U.S.C. 154(b) by 728 days.

(21) Appl. No.: 14/928,164

(22) Filed: Oct. 30, 2015

(65) Prior Publication Data

US 2017/0121030 A1 May 4, 2017

(51) Int. Cl.
*B64D 33/02* (2006.01)
*B64D 27/16* (2006.01)
(Continued)

(52) U.S. Cl.
CPC .............. *B64D 33/02* (2013.01); *B64D 27/16* (2013.01); *B64D 29/00* (2013.01); *F04D 29/522* (2013.01);
(Continued)

(58) Field of Classification Search
CPC ........ B64D 33/02; B64D 29/00; B64D 27/16; B64D 2033/0226; B64D 2033/0206; F04D 29/325; F04D 29/524
See application file for complete search history.

(56) References Cited

U.S. PATENT DOCUMENTS 3,664,612 A * 5/1972 Viall et al. ............. B64D 33/02
137/15.1
4,132,240 A * 1/1979 Frantz ..................... B64D 33/02
137/15.1
(Continued)

FOREIGN PATENT DOCUMENTS

RU          104537 U1    5/2011
WO      2014150500 A1    9/2014

OTHER PUBLICATIONS

Trapp et al., "Aspects of isolated nacelles near the ground during Crosswind operation", Proceedings of the 11th Brazilian Congress of Thermal Sciences and Engineering—ENCIT 2006 Braz. Soc. of Mechanical Sciences and Engineering—ABCM, Curitiba, Brazil, p. 2 of 9 pages.
(Continued)

*Primary Examiner* — Carlos A Rivera
*Assistant Examiner* — Adam W Brown
(74) *Attorney, Agent, or Firm* — GE Global Patent Operation; Nitin N. Joshi (57) ABSTRACT

A turbofan engine is provided. The turbofan engine includes a nacelle housing including a radially outer wall and a radially inner wall that defines an interior cavity within the nacelle housing. The turbofan engine also includes a fan assembly positioned at least partially within the interior cavity. A flow passage is defined between the radially outer wall and the radially inner wall for channeling a flow of air therethrough. The flow passage is configured to couple a portion of the interior cavity upstream from the fan assembly in flow communication with an ambient environment exterior from the radially outer wall.

18 Claims, 6 Drawing Sheets

(51) Int. Cl.
*B64D 29/00* (2006.01)
*F04D 29/68* (2006.01)
*F04D 29/52* (2006.01)

(52) U.S. Cl.
CPC ......... *F04D 29/682* (2013.01); *F04D 29/684* (2013.01); *B64D 2033/0206* (2013.01); *B64D 2033/0226* (2013.01); *F05D 2220/36* (2013.01); *F05D 2270/102* (2013.01)

(56) References Cited

U.S. PATENT DOCUMENTS

| | | | |
|---|---|---|---|
| 4,749,150 A * | 6/1988 | Rose | B64C 21/06 181/214 |
| 5,934,611 A * | 8/1999 | Tindell | B64C 21/025 181/214 |
| 6,509,081 B1 * | 1/2003 | Diamond | B32B 3/12 428/116 |
| 7,200,999 B2 * | 4/2007 | Bagnall | B64C 21/06 60/226.1 |
| 7,588,212 B2 | 9/2009 | Moe et al. | |
| 8,192,147 B2 | 6/2012 | Haas | |
| 8,353,164 B2 | 1/2013 | Morford et al. | |
| 8,596,573 B2 | 12/2013 | Jain | |
| 8,640,986 B2 * | 2/2014 | Surply | B64D 33/02 244/204 |
| 8,839,805 B2 * | 9/2014 | Zysman | B64D 33/02 137/15.1 |
| 8,844,553 B2 * | 9/2014 | Zysman | B64D 33/02 137/15.1 |
| 9,644,535 B2 * | 5/2017 | Zysman | F02C 7/04 |
| 2015/0030446 A1 | 1/2015 | Gonidec et al. | |

OTHER PUBLICATIONS

Peters et al., "Ultrashort Nacelles for Low Fan Pressure Ratio Propulsors", vol. 137, Issue 2, 14 pages, Sep. 10, 2014.

* cited by examiner

TURBOFAN ENGINE AND METHOD OF REDUCING AIR FLOW SEPARATION THEREIN

BACKGROUND

The present disclosure relates generally to turbofan engines and, more specifically, to systems and methods of reducing air flow separation in a turbofan engine with a bias-flow acoustic liner.

At least some known gas turbine engines, such as turbofans, include a fan, a core engine, and a power turbine. The core engine includes at least one compressor, a combustor, and a high-pressure turbine coupled together in a serial flow relationship. More specifically, the compressor and high-pressure turbine are coupled through a shaft to form a high-pressure rotor assembly. Intake air is channeled through the fan, and air entering the core engine is mixed with fuel and ignited to form a high energy gas stream. The high energy gas stream flows through the high-pressure turbine to rotatably drive the high-pressure turbine such that the shaft rotatably drives the compressor. After being discharged from the high-pressure turbine, the gas stream continues to expand as it flows through a low-pressure turbine positioned aft of the high-pressure turbine. The low-pressure turbine includes a rotor assembly coupled to a drive shaft and a fan. The low-pressure turbine rotatably drives the fan through the drive shaft.

Many modern commercial aircraft operate in high velocity crosswind conditions and low-speed operation at takeoff and landing, for example. The combination of such operating conditions can cause distortions in the intake air channeled towards the fan, which can cause flow separation at an interior surface of an engine nacelle housing. Flow separation at the interior surface of an engine nacelle housing facilitates forming rotating vortices within the engine nacelle housing, which can cause a rotating stall condition within the turbofan. At least some known engine nacelle housings are designed to mitigate flow separation within the turbofan. For example, at least some known engine nacelle housings are relatively thick and have a forward portion that extends past a forward face of the fan to restrict high velocity crosswind from distorting the flow of the intake air before entering the fan. However, further design modifications may be necessary to reduce distortions to the flow of the intake air.

BRIEF DESCRIPTION

In one aspect, a turbofan engine is provided. The turbofan engine includes a nacelle housing including a radially outer wall and a radially inner wall that defines an interior cavity within the nacelle housing. The turbofan engine also includes a fan assembly positioned at least partially within the interior cavity. A flow passage is defined between the radially outer wall and the radially inner wall for channeling a flow of air therethrough. The flow passage is configured to couple a portion of the interior cavity upstream from the fan assembly in flow communication with an ambient environment exterior from the radially outer wall.

In another aspect, an aircraft is provided. The aircraft includes a fuselage, a wing structure coupled to the fuselage, and a turbofan engine coupled to at least one of the fuselage and the wing structure. The turbofan engine includes a nacelle housing including a radially outer wall and a radially inner wall that defines an interior cavity within the nacelle housing. The turbofan engine also includes a fan assembly positioned at least partially within the interior cavity. A flow passage is defined between the radially outer wall and the radially inner wall for channeling a flow of air therethrough. The flow passage is configured to couple a portion of the interior cavity upstream from the fan assembly in flow communication with an ambient environment exterior from the radially outer wall.

In yet another aspect, a method of reducing air flow separation in a turbofan engine is provided. The method includes defining a flow passage between a radially outer wall and a radially inner wall of a nacelle housing of the turbofan engine. The flow passage is configured to couple a portion of an interior cavity of the nacelle housing upstream from a fan assembly in flow communication with an ambient environment exterior from the radially outer wall. The method further includes channeling a flow of air between the interior cavity and the ambient environment.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to systems and methods of reducing air flow separation in a turbofan engine. More specifically, the systems described herein include a flow passage defined in a nacelle housing upstream from a fan assembly of a turbofan engine. The flow passage is for channeling a flow of air between an interior cavity of the nacelle housing and an ambient environment exterior of the nacelle housing. In one embodiment, an actuating door in the nacelle housing is selectively operable between an open position and a closed position to allow the flow of air to be channeled therethrough. An acoustic liner is positioned within the nacelle housing, which acts as an acoustic bias-flow liner when the actuating door is open, and acts as a conventional liner when the door is closed. The flow of air is either combined with a flow of intake air channeled towards the fan assembly, or is drawn from an interior cavity of the nacelle housing to facilitate re-attaching the intake air to an inner surface of the nacelle housing to reduce distortions in the intake air caused by high crosswinds blowing transversely relative to a centerline of the turbofan engine. As such, when channeled through the acoustic bias-flow liner, improvements in flow separation and noise reduction are achieved.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Figure 1:
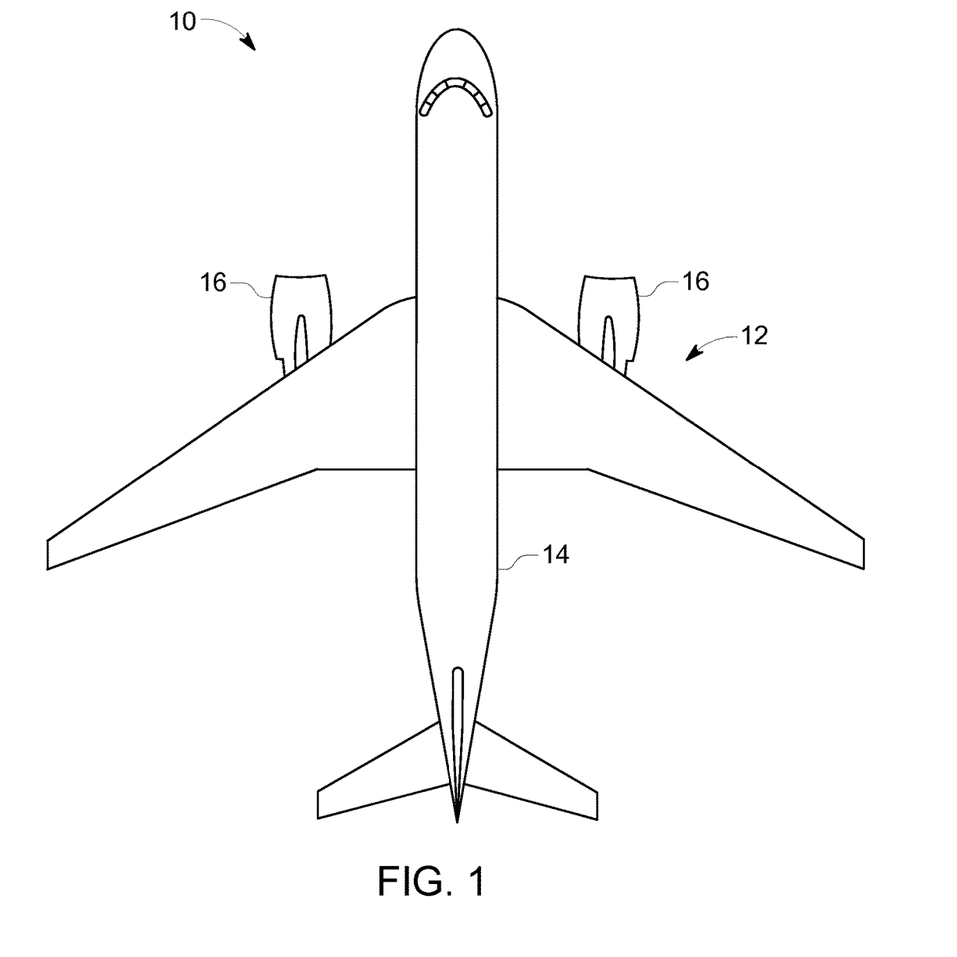
FIG. 1 is a schematic illustration of an exemplary aircraft.

FIG. 1 is a schematic illustration of an aircraft 10. Aircraft 10 includes a wing structure 12 coupled to and extending from a fuselage 14. Aircraft 10 also includes turbofan engines 16 coupled to wing structure 12. Alternatively, turbofan engines 16 are coupled to at least one of fuselage 14 and wing structure 12. The plurality of structures shown on aircraft 10 is for illustrative purposes only, and it should be understood that aircraft 10 additionally includes a large number of other structures. As used herein, the term "aircraft" may include, but is not limited to only including, airplanes, unmanned aerial vehicles (UAVs), gliders, helicopters, and/or any other object that travels through airspace. Moreover, it should be understood that, although an aerospace example is shown, the principles of the disclosure may be applied to other structures, such as a maritime structure or an automotive structure.

Figure 2:
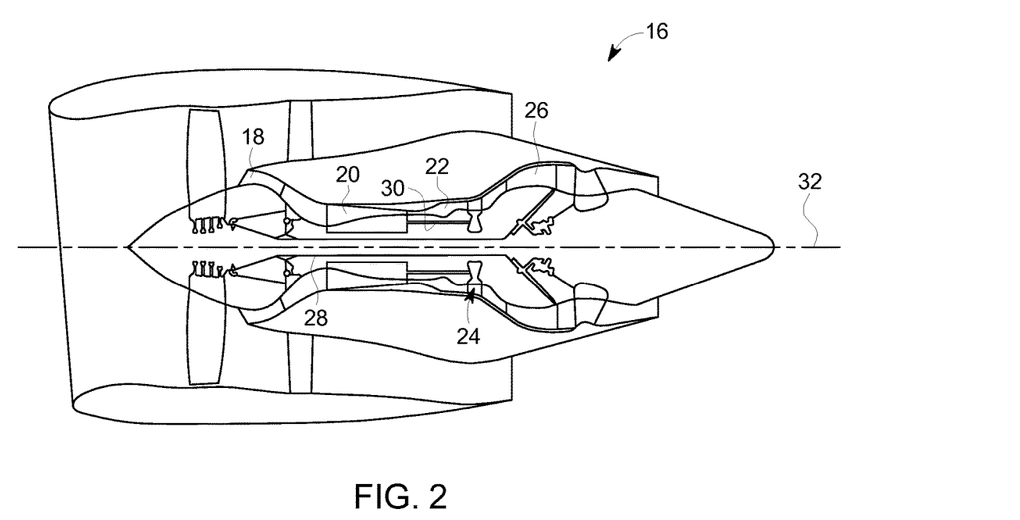
FIG. 2 is a schematic illustration of an exemplary turbofan engine that may be used with the aircraft shown in FIG. 1.

FIG. 2 is a schematic illustration of an exemplary turbofan engine 16. Turbofan engine 16 includes a booster compressor 18, a high-pressure compressor 20, and a combustor assembly 22. Turbofan engine 16 also includes a high-pressure turbine 24 and a low-pressure turbine 26 arranged in a serial, axial flow relationship. Booster compressor 18 and low-pressure turbine 26 are coupled along a first shaft 28, and high-pressure compressor 20 and high-pressure turbine 24 are coupled along a second shaft 30.

In operation, air flows through booster compressor 18 and compressed air is supplied from booster compressor 18 to high-pressure compressor 20. The compressed air is discharged towards combustor assembly 22 and mixed with fuel to form a flow of combustion gas discharged towards turbines 24 and 26. The flow of combustion gas drives turbines 24 and 26 about a centerline 32 of turbofan engine 16.

Figure 3:
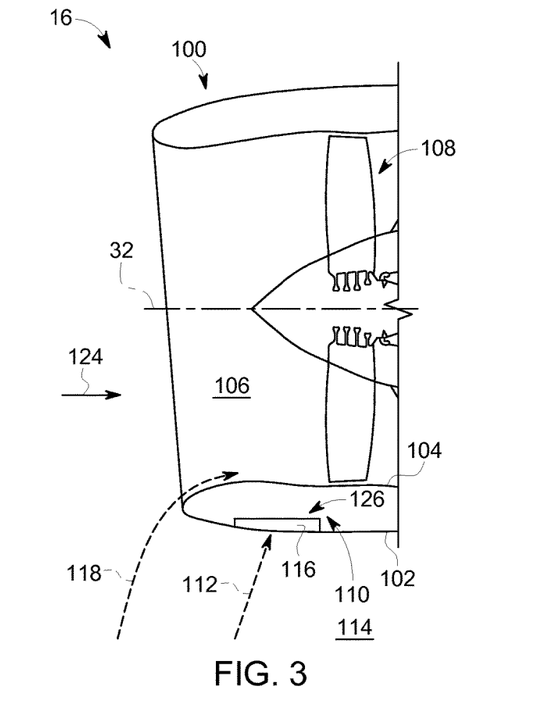
FIG. 3 is an enlarged schematic illustration of a portion of the turbofan engine shown in FIG. 2 in a first operational position.
Figure 4:
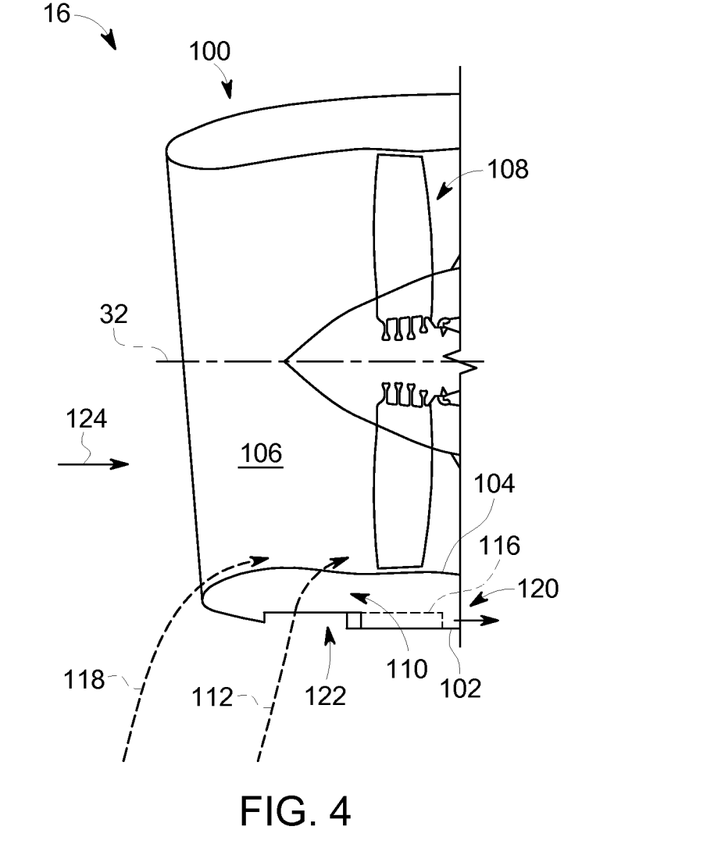
FIG. 4 is an enlarged schematic illustration of the portion of the turbofan engine shown in FIG. 3 in a second operational position.

FIG. 3 is an enlarged schematic illustration of a portion of turbofan engine 16 in a first operational position, and FIG. 4 is an enlarged schematic illustration of the portion of turbofan engine 16 in a second operational position. In the exemplary embodiment, turbofan engine 16 includes a nacelle housing 100 having a radially outer wall 102 and a radially inner wall 104 that defines an interior cavity 106 within nacelle housing 100. A fan assembly 108 is positioned within nacelle housing 100 upstream from booster compressor 18 (shown in FIG. 2). A flow passage 110 is defined between radially outer wall 102 and radially inner wall 104 for channeling a flow of air 112 therethrough. More specifically, flow passage 110 couples a portion of interior cavity 106 upstream from fan assembly 108 in flow communication with an ambient environment 114 exterior from radially outer wall 102. For example, in one embodiment, radially outer wall 102 is defined on a high pressure side of nacelle housing 100, and radially inner wall 104 is defined on a low pressure side of nacelle housing 100. As such, the flow of air 112 naturally flows from exterior of nacelle housing 100 towards interior cavity 106 via flow passage 110.

In the exemplary embodiment, nacelle housing 100 includes an actuating door 116 coupled to radially outer wall 102. Actuating door 116 is selectively operable between a closed position and an open position at least partially based on the velocity of aircraft 10 (shown in FIG. 1), and a velocity of a crosswind 118 at radially outer wall 102. For example, referring to FIG. 4, when the velocity of crosswind 118 is greater than a predetermined threshold, or if aircraft 10 is traveling at a relatively low-speed first velocity (e.g., at takeoff or landing), actuating door 116 is in an open position 120 to facilitate channeling the flow of air 112 therethrough. More specifically, when in open position 120, the space once occupied by actuating door 116 defines an opening 122 in radially outer wall 102, which at least partially defines flow passage 110. In the exemplary embodiment, crosswind 118 is generally misaligned with centerline 32 of turbofan engine 16, which facilitates distorting a flow of intake air 124 channeled towards fan assembly 108.

Alternatively, referring to FIG. 3, when the velocity of crosswind 118 is less than the predetermined threshold, or if aircraft 10 is traveling at a greater second velocity (e.g., at cruise), actuating door 116 is in a closed position 126 to increase the aerodynamic efficiency of nacelle housing 100. While shown as a sliding door that retracts within nacelle housing 100, it should be understood that actuating door 116 may have any range of motion to enable it to be selectively operable between open position 120 and closed position 126. Moreover, as will be described in more detail below, while shown as being channeled externally from nacelle housing 100 towards interior cavity, it should be understood that the flow of air 112 can be drawn from interior cavity 106 to reduce flow separation therein.

Figure 5:
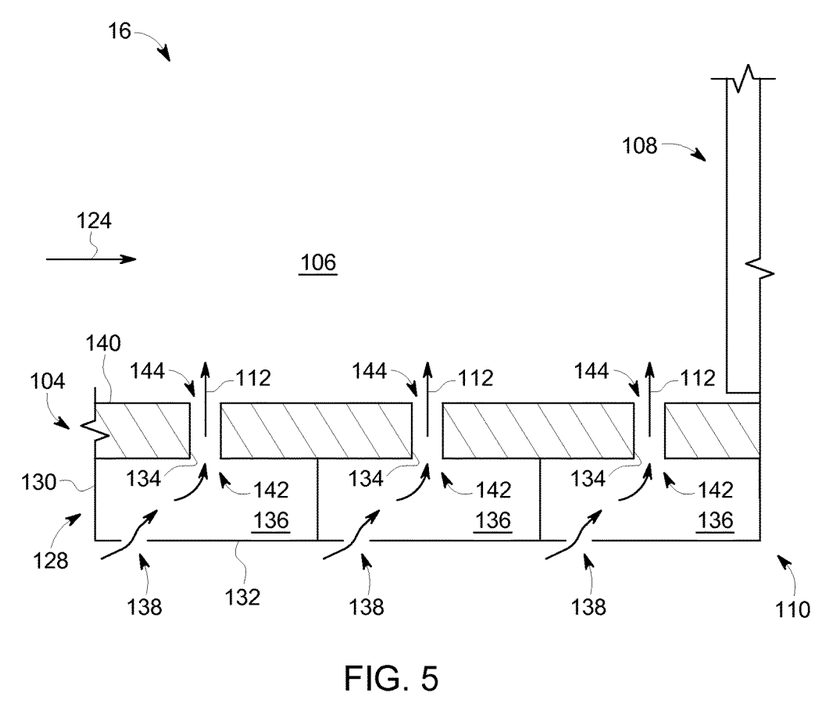
FIG. 5 is a cross-sectional illustration of a portion of a flow passage that may be used with the turbofan engine shown in FIG. 2, in accordance with a first embodiment of the disclosure.

FIG. 5 is a cross-sectional illustration of a portion of flow passage 110 that may be used with turbofan engine 16, in accordance with a first embodiment of the disclosure. In the exemplary embodiment, nacelle housing 100 (shown in FIGS. 3 and 4) further includes an acoustic liner 128 positioned between radially outer wall 102 (shown in FIGS. 3 and 4) and radially inner wall 104. More specifically, acoustic liner 128 includes a honeycomb structure 130 coupled to radially inner wall 104, and a face sheet 132 coupled to honeycomb structure 130 on an opposing side thereof from radially inner wall 104.

At least one of radially inner wall 104 and acoustic liner 128 have one or more openings or channels defined therein that at least partially define flow passage 110. More specifically, nacelle housing 100 includes a plurality of first openings 134 defined in radially inner wall 104 for channeling the flow of air 112 therethrough. The plurality of first openings 134 are positioned upstream from fan assembly 108. Moreover, honeycomb structure 130 includes a plurality of channels 136 defined therein, and face sheet 132 includes a plurality of second openings 138 defined therein and a sheet (not shown) of wire mesh having openings defined therein, for at least partially defining flow passage 110. As such, opening 122 in radially outer wall 102 (each shown in FIG. 4), second openings 138, respective channels 136 in honeycomb structure 130, and first openings 134 are coupled in a serial flow relationship to enable the flow of air 112 to reduce flow separation of the flow of intake air 124 at an inner surface 140 of radially inner wall 104.

Figure 6:
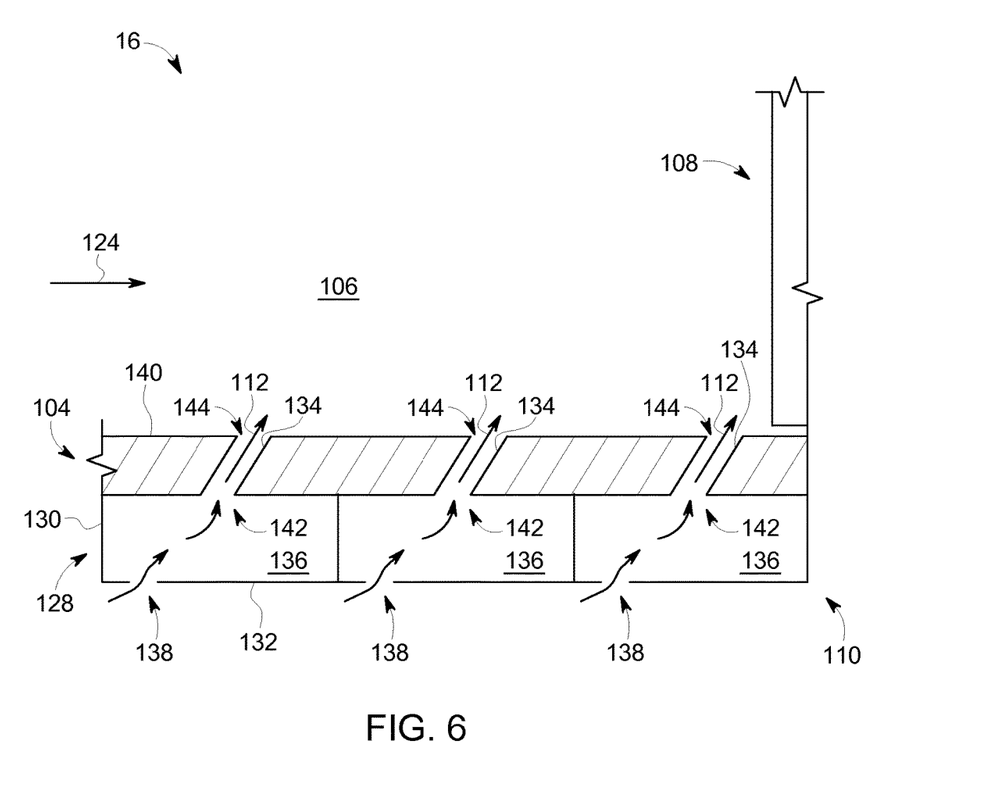
FIG. 6 is a cross-sectional illustration of the portion of the flow passage shown in FIG. 5, in accordance with a second embodiment of the disclosure.

FIG. 6 is a cross-sectional illustration of the portion of flow passage 110 that may be used with turbofan engine 16, in accordance with a second embodiment of the disclosure. In the exemplary embodiment, the plurality of first openings 134 are angled obliquely relative to inner surface 140 of radially inner wall 104 such that the flow of air 112 that naturally flows from exterior of nacelle housing 100 is directed towards fan assembly 108. More specifically, first openings 134 are angled such that an inlet 142 of each first opening 134 is positioned radially outward from an outlet 144 of each first opening 134. As such, the flow of air 112 is combined with the flow of intake air 124 to reduce flow separation at inner surface 140 in a more efficient manner.

Figure 7:
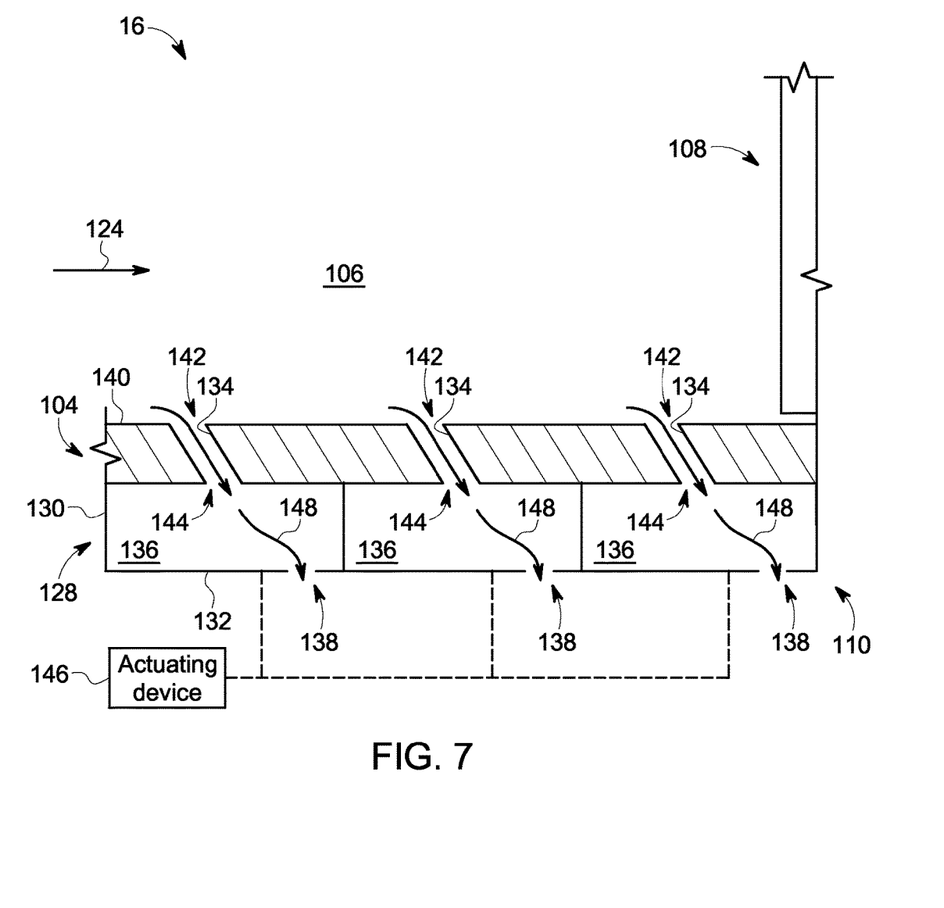
FIG. 7 is a cross-sectional illustration of the portion of the flow passage shown in FIG. 5, in accordance with a third embodiment of the disclosure.

FIG. 7 is a cross-sectional illustration of the portion of flow passage 110 that may be used with turbofan engine 16, in accordance with a third embodiment of the disclosure. In the exemplary embodiment, nacelle housing 100 includes an actuating device 146 that draws a flow of air 148 from interior cavity 106 towards exterior of nacelle housing 100 via flow passage 110. More specifically, the flow of air 148 is drawn through first openings 134, channels 136 in honeycomb structure 130, second openings 138, and opening 122 in radially outer wall 102 (each shown in FIG. 4) for discharge towards ambient environment 114 (shown in FIGS. 3 and 4). Drawing the flow of air 148 from interior cavity 106 facilitates re-attaching the flow of intake air 124 to inner surface 140 of radially inner wall 104.

In one embodiment, the plurality of first openings 134 are angled obliquely relative to inner surface 140 of radially inner wall 104 such that the flow of air drawn from interior cavity 106 flows through the plurality of first openings 134 in a downstream direction. More specifically first openings 134 are angled such that each inlet 142 is positioned radially inward from each outlet 144 of first openings 134. As such, the flow of intake air 124 is re-attached to inner surface 140 of radially inner wall 104 in a more efficient manner.

The systems and methods described herein relate to improving the performance of turbofan engines operating in high crosswind conditions. More specifically, the systems and methods are for reducing air flow separation of intake air in the nacelle housing of a turbofan engine caused by crosswind distortions. The system provides a flow passage in the nacelle housing upstream from a fan assembly of the turbofan engine. The flow passage facilitates channeling a flow of air between an interior cavity of the nacelle housing and an ambient environment exterior of the nacelle housing. As such, the flow of air facilitates reducing flow separation within the nacelle housing.

An exemplary technical effect of the system and methods described herein includes at least one of: (a) reducing flow separation of intake air at an inner surface of a nacelle housing; (b) reducing the likelihood of rotating vortices from forming within a turbofan engine; (c) improving the thrust and efficiency of a turbofan engine when operating in high crosswind conditions; and (d) using an acoustic bias-flow liner to reduce noise from the engines at takeoff in high crosswind conditions.

Exemplary embodiments of a turbofan engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan engines and related methods as described herein. Rather, the exemplary embodiment can be implemented and utilized in connection with many applications where reducing flow separation in a housing is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A turbofan engine comprising:
a nacelle housing comprising a radially outer wall and a radially inner wall that defines an interior cavity within said nacelle housing, wherein said nacelle housing further comprises:
   a plurality of first openings defined in said radially inner wall for channeling a flow of air therethrough and an opening defined in the radially outer wall;
   an acoustic liner positioned between said radially outer wall and said radially inner wall, wherein the acoustic liner comprises:
      a honeycomb structure coupled to said radially inner wall, wherein the honeycomb structure comprises one or more channels defined therein that at least partially define a flow passage; and
      a face sheet coupled to the honeycomb structure on an opposing side thereof from said radially inner wall, wherein the face sheet comprises a plurality of second openings defined therein;
a fan assembly positioned at least partially within said interior cavity, wherein said flow passage is defined between said radially outer wall and said radially inner wall for channeling the flow of air therethrough, said flow passage configured to couple a portion of said interior cavity upstream from said fan assembly in flow communication with an ambient environment exterior from said radially outer wall, wherein the opening in the radially outer wall, the plurality of second openings, the respective one or more channels, and the respective first openings are coupled in a serial flow relationship to enable the flow of air; and
said nacelle housing further comprising an actuating door coupled to said radially outer wall of said nacelle housing, said actuating door selectively positioned between an open position and a closed position.

2. The turbofan engine in accordance with claim 1, wherein said radially outer wall is defined on a high pressure side of said nacelle housing, and said radially inner wall is defined on a low pressure side of said nacelle housing such that the flow of air naturally flows from exterior of said nacelle housing towards said interior cavity through said flow passage.

3. The turbofan engine in accordance with claim 2, wherein said plurality of first openings positioned upstream from said fan assembly.

4. The turbofan engine in accordance with claim 3, wherein said plurality of first openings are angled obliquely relative to a surface of said radially inner wall such that, the flow of air that naturally flows from exterior of said nacelle housing is directed towards said fan assembly.

5. The turbofan engine in accordance with claim 1, wherein said actuating door is in the open position when a velocity of a crosswind at said radially outer wall is greater than a predetermined threshold, and is in the closed position when the crosswind velocity is less than the predetermined threshold.

6. An aircraft comprising:
a fuselage;
a wing structure coupled to said fuselage; and
a turbofan engine coupled to at least one of said fuselage and said wing structure, said turbofan engine comprising:
a nacelle housing comprising a radially outer wall and a radially inner wall that defines an interior cavity within said nacelle housing, wherein said nacelle housing further comprises:
a plurality of first openings defined in said radially inner wall for channeling flow of air therethrough and an opening defined in the radially outer wall;
an acoustic liner positioned between said radially outer wall and said radially inner wall, wherein the acoustic liner comprises:
a honeycomb structure coupled to said, radially inner wall, wherein the honeycomb structure comprises one or more channels defined therein that at least partially define a flow passage; and
a face sheet coupled to the honeycomb structure on an opposing side thereof from said radially inner wall, wherein the face sheet comprises a plurality of second openings defined therein;
a fan assembly positioned at least partially within said interior cavity, wherein said flow passage is defined between said radially outer wall and said radially inner wall for channeling the flow of air therethrough, said flow passage configured to couple a portion of said interior cavity upstream from said fan assembly in flow communication with an ambient environment exterior from said radially outer wall, wherein the opening in the radially outer wall, the plurality of second openings, the respective one or more channels, and the respective first openings are coupled in a serial flow relationship to enable the flow of air; and
said nacelle housing further comprises an actuating door coupled to said radially outer wall of said nacelle housing, said actuating door selectively positioned between an open position and a closed position.

7. The aircraft in accordance with claim 6, wherein said radially outer wall is defined on a high pressure side of said nacelle housing, and said radially inner wall is defined on a low pressure side of said nacelle housing such that the flow of air naturally flows from exterior of said nacelle housing towards said interior cavity via said flow passage.

8. The aircraft in accordance with claim 7, wherein said plurality of first openings positioned upstream from said fan assembly.

9. The aircraft in accordance with claim 8, wherein said plurality of first openings are angled obliquely relative to a surface of said radially inner wall such that the flow of air that naturally flows from exterior of said nacelle housing is directed towards said fan assembly.

10. The aircraft in accordance with claim 6, wherein said actuating door is in the open position when the aircraft is traveling at a first velocity, and is in the closed position when the aircraft is traveling at a greater second velocity.

11. A method of reducing air flow separation in a turbofan engine, said method comprising:
defining a flow passage between a radially outer wall and a radially inner wall of a nacelle housing of the turbofan engine, wherein the flow passage is configured to couple a portion of an interior cavity of the nacelle housing upstream from a fan assembly in flow communication with an ambient environment exterior from the radially outer wall, wherein said nacelle housing comprises a plurality of first openings defined in said radially inner wall and an opening defined in the radially outer wall, an acoustic liner positioned between said radially outer wall and said radially inner wall, wherein the acoustic liner comprises a honeycomb structure coupled to said radially inner wall, wherein the honeycomb structure comprises one or more channels and a face sheet coupled to the honeycomb structure on an opposing side thereof from said radially inner wall, wherein the face sheet comprises a plurality of second openings defined therein;
channeling a flow of air between the interior cavity and the ambient environment, wherein the opening in the radially outer wall, the plurality of second openings, the respective one or more channels, and the respective first openings are coupled in a serial flow relationship to enable the flow of air; and
selectively positioning an actuating door defined in the radially outer wall between an open position and a closed position, such that the flow of air is selectively channeled through the flow passage.

12. The method in accordance with claim 11 further comprising:
defining the radially outer wall on a high pressure side of the nacelle housing; and defining the radially inner wall on a low pressure side of the nacelle housing such that the flow of air naturally flows from exterior of the nacelle housing, towards the interior cavity via the flow passage.

13. The method in accordance with claim 11 further comprising drawing the flow of air from the interior cavity towards the ambient environment exterior from the radially outer wall.

14. The turbofan engine in accordance with claim 1, wherein plurality of first openings are angled obliquely relative to an inner surface of the radially inner wall such that the air drawn from the interior cavity flows through the plurality of first openings in a downstream direction.

15. The turbofan engine in accordance with claim 1, wherein the plurality of first openings are angled such that an inlet of each of the plurality of first openings is positioned radially outward from an outlet of each of the plurality of first openings.

16. The turbofan engine in accordance with claim 1, further comprising a high-pressure turbine and a low-pressure turbine arranged in a serial and axial flow relationship.

17. The turbofan engine in accordance with claim 5, wherein the turbofan engine comprises a centerline, and wherein crosswind is misaligned with the centerline such that a flow of intake air channeled towards the fan assembly is distorted.

18. The method in accordance with claim 11, further comprising drawing the flow of air from the interior cavity to facilitate re-attaching a flow of intake air to an inner surface of the radially inner wall.

\* \* \* \* \*